United States Patent [19]

Gerard et al.

[11] 4,421,609

[45] Dec. 20, 1983

[54] PROCESS FOR PRODUCING ELECTRODE WITH CURRENT OUTLETS

[75] Inventors: Francois Gerard; Jean-Yves Machat, both of Clermont-Ferrand, France

[73] Assignee: Compagnie Generale des Etablissements Michelin, Clermont-Ferrand, France

[21] Appl. No.: 339,485

[22] Filed: Jan. 15, 1982

Related U.S. Application Data

[62] Division of Ser. No. 166,027, Jul. 7, 1980, Pat. No. 4,336,124.

[30] Foreign Application Priority Data

Jul. 16, 1979 [FR] France .................................. 79 18549

[51] Int. Cl.³ .............................................. C25D 5/02
[52] U.S. Cl. ........................................ 204/16; 204/24
[58] Field of Search ............... 204/254, 268, 286, 288, 204/290 R, 15, 16, 24, 29; 429/208–211

[56] References Cited

U.S. PATENT DOCUMENTS

| 2,646,455 | 7/1953 | Jeannin | 429/206 |
| 2,861,115 | 11/1958 | Berg | 429/211 |
| 2,865,973 | 12/1958 | Hartman et al. | 429/223 |
| 3,549,505 | 12/1970 | Hanusa | 204/11 |
| 3,600,227 | 8/1971 | Hardman | 204/56 R |
| 3,649,865 | 3/1972 | Holmes | 313/350 |
| 3,948,684 | 4/1976 | Armstrong | 427/115 |
| 4,091,176 | 5/1978 | Alfensar | 429/40 |
| 4,211,829 | 7/1980 | Coulombeau | 429/27 |

FOREIGN PATENT DOCUMENTS

| 911504 | 5/1954 | Fed. Rep. of Germany . |
| 1671877 | 3/1971 | Fed. Rep. of Germany . |
| 2610253 | 9/1976 | Fed. Rep. of Germany . |
| 1281848 | 12/1961 | France . |
| 1348135 | 11/1963 | France . |
| 1465642 | 12/1966 | France . |
| 2003784 | 11/1969 | France . |
| 2217817 | 9/1974 | France . |
| 2341208 | 9/1977 | France . |
| 2386148 | 10/1978 | France . |
| 695854 | 8/1953 | United Kingdom . |
| 809562 | 2/1959 | United Kingdom . |
| 1030482 | 5/1966 | United Kingdom . |
| 1131809 | 10/1968 | United Kingdom . |
| 1163433 | 9/1969 | United Kingdom . |
| 1193136 | 5/1970 | United Kingdom . |
| 1238183 | 7/1971 | United Kingdom . |
| 1261132 | 1/1972 | United Kingdom . |
| 1315538 | 5/1973 | United Kingdom . |

Primary Examiner—G. L. Kaplan
Assistant Examiner—William Leader
Attorney, Agent, or Firm—Brumbaugh, Graves, Donohue & Raymond

[57] ABSTRACT

Electrode comprising a body, with a conductive porous skeleton, and a current outlet. The current outlet comprises a conductive plate with roughnesses which penetrate into the skeleton. The plate is rigidly connected to the skeleton by means of an electrolytic metal deposit.

4 Claims, 10 Drawing Figures

PROCESS FOR PRODUCING ELECTRODE WITH CURRENT OUTLETS

This is a division of application Ser. No. 166,027, filed July 7, 1980, now U.S. Pat. No. 4,336,124.

The invention concerns electrochemical devices.

The expression "electrochemical device" is used in a very broad sense, that is to say it covers all devices in which electrochemical reactions take place, which devices may either produce or absorb electric current, for instance in order to prepare products by electrolysis.

The invention in particular relates to the electrodes which are used in these devices and which comprise at least one body formed at least in part of an electron-conductive porous skeleton. The body comprises an active or catalytic material which constitutes the skeleton at least in part and/or is in contact with the skeleton. This active or catalytic material may consist of one or more chemical substances.

The skeleton may consist entirely of at least one conductive material; it may, on the other hand, consist of one or more nonconductive materials, for instance glass or a plastic, which are covered by a conductive layer.

The invention concerns more particularly the current outlets of these electrodes. By "current outlet" of an electrode there is understood the electron-conductive part or assembly of parts which permit the circulation of electrons between the body of the electrode and the other elements of the electric circuit in which the electrode is contained, the electrons being capable of moving either from the current outlet towards the body of the electrode or from the body of the electrode towards the current outlet. It goes without saying that each electrode may possibly have several current outlets. The current outlet may possibly furthermore assure the mechanical connection between the body of the electrode and the other elements of the mechanical structure of the electrochemical device in which the electrode is located.

French patent applications Nos. 2,386,148 and 2,389,029 (the latter corresponding to U.S. Pat. No. 4,211,829) each describe a metal/porous-separator assembly. The application No. 2,386,148 concerns a separator/electrode assembly such that the electrode constitutes a metallic deposit on the separator, this deposit being obtained by electrolysis on a metallic chemical deposit previously produced on the insulating membrane. The aforementioned application No. 2,389,029 describes the fastening of an electron collector onto an insulating membrane, the fastening being obtained by producing a metallic electrolytic deposit in a part of the open pores of the membrane by lines of electric field which pass through the membrane. Neither of these two applications makes it possible to produce a current outlet for an electrode having a conductive porous skeleton.

French Pat. No. 1,465,642 describes an electrode for an electric storage battery having a conductive support consisting of a fabric or felt of flexible fibers of graphite and an electrochemically active material deposited on and/or between said fibers. The patent mentions briefly that the current outlets of the electrode may consist of metallic U-links which clamp strips of graphite felt.

U.S. Pat. No. 3,600,227 describes battery plates having a skeleton of welded metallic fibers. In order to obtain the current outlets, one side of these plates is compressed in the form of a base on which strips of nickel are spot welded. The current outlets corresponding to these last two patents are characterized either by insufficient mechanical strength or by substantial electrical resistance, or else by excessive weight.

The object of the invention is to overcome the aforesaid drawbacks.

Accordingly, the electrode of the invention, which comprises, on the one hand, at least one body formed at least in part of an electron-conductive porous skeleton and, on the other hand, at least one current outlet comprising at least one electron-conductive plate with roughnesses which penetrate into the skeleton, is characterized by the fact that:

the plate is firmly connected with the skeleton by an electrolytic metallic deposit which adheres both to the skeleton and to the plate, this deposit being inert under the conditions of use of the electrode.

The invention also concerns the processes used to produce the electrode of the invention as well as the devices employing this electrode.

The entirely schematic figures of the accompanying drawing with their description as well as the examples which follow are intended to illustrate the invention and to facilitate an understanding thereof without, however, limiting its scope.

Figure 1:
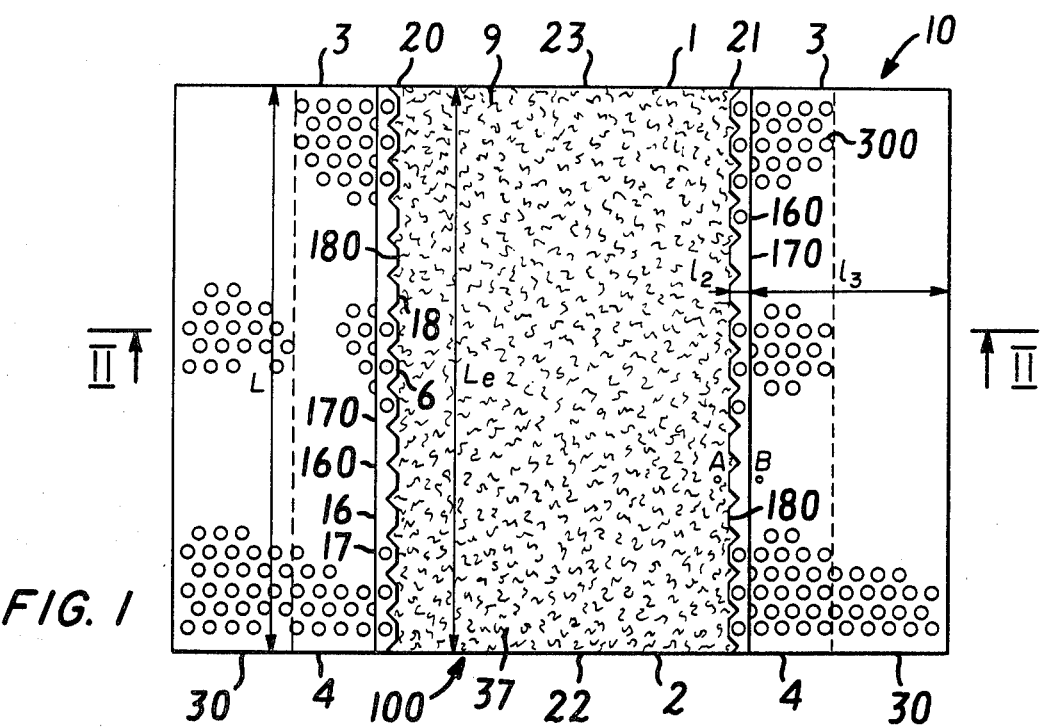
FIG. 1 shows, in plan view, an electrode in accordance with the invention.
Figure 2:
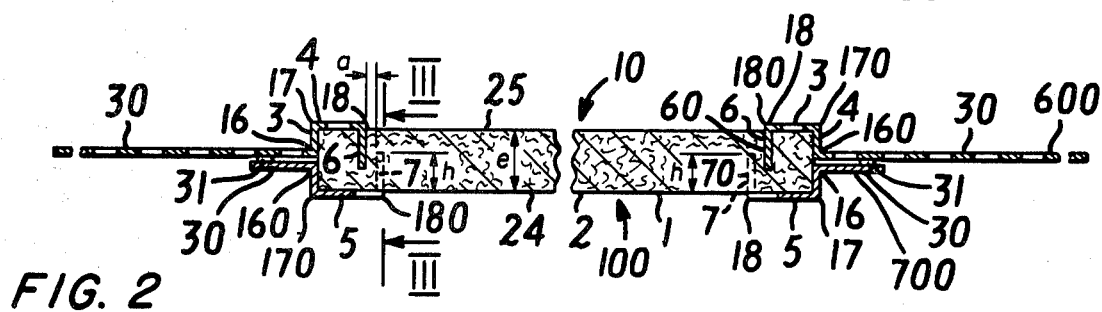
FIG. 2 shows, in cross-section, the electrode of FIG. 1, this cross-section being taken along the plane represented in the line II—II of FIG. 1.
Figure 3:
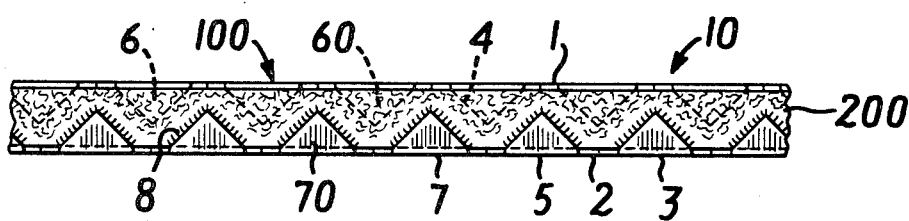
FIG. 3 shows, in cross-section, the electrode of FIGS. 1 and 2, this cross-section being taken along the plane represented by the line III—III of FIG. 2.

FIGS. 1, 2 and 3 show an electrode in accordance with the invention. This electrode 10 comprises a body 1 formed in part of an electron-conductive porous skeleton 2 and two current outlets 3. Each outlet 3 comprises two electron-conductive plates 4, 5. The plate 4 has roughnesses 6 and the plate 5 has roughnesses 7. These roughnesses 6 and 7 have the shape of triangular teeth which penetrate into the skeleton 2. FIG. 3 shows the triangular shape of these teeth 6 and 7, the teeth 6 being shown in dashed line.

Plates 4, 5 are firmly connected to the skeleton 2 by an electrolytic metallic deposit which adheres both to the skeleton 2 and to these plates. FIG. 3 shows schematically in the form of short hatchings a part of such a deposit 8 adhering to the teeth 7.

The electrode 10 is produced, for example, in the following manner.

(a) Skeleton 2 of the body 1

Before incorporation of the active material, the body 1 consists of the skeleton 2 formed of a network of long, thin extensively randomized, entangled and wound electron-conductive fibers 9, the skeleton 2 thus being a substantially anisotropic felt.

This felt 2 is in the form of a rectangular flexible plate. The fibers 9 may, for instance, be of carbon, of metallized carbon, of metallized nonconductive material (for instance glass or plastic), or of metallic material, the metal or metals, if any, of these fibers being compatible with the operating conditions of the electrode.

(b) The putting in place of the outlet plates

Each plate 4, 5 is made with an electron-conductive material, for instance with a metallic material, the metal or metals of these plates in contact with the felt being compatible with the operating conditions of the electrode.

Each plate 4, 5 is initially in substantially flat shape with openings 300 which have been shown only in part in FIG. 1 in order to simplify the drawing. These plates 4, 5 may for instance be grids, perforated plates, expanded metal sheets, etc.

Figure 4:
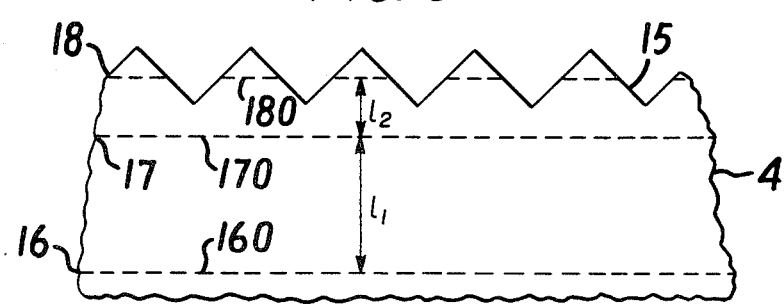
FIG. 4 shows, in plan view, a portion of a conductive plate used for the production of the electrode shown in FIGS. 1 to 3.

Each of these flat plates 4, 5 is cutout on a press so as to obtain protruding sawtooth-shaped parts. FIG. 4 shows, for instance, a portion of a plate 4 with such protruding parts 15.

Each plate 4, 5 is then folded three times at a right angle so as to form the folds 16, 17, 18, the substantially parallel lines of these folds being represented by the numbers 160, 170 and 180, respectively, these lines being shown in dashed line in FIG. 4. The line 180 of the fold 18 passes through the protruding parts 15 so that the points of the folded protruding parts 15 constitute teeth 6 and 7.

The line 160 of the fold 16 is furthest from the protruding parts 15 and the line 170 of the fold 17 is located between the lines 160, 180 following the corresponding plate. None of the lines 160, 170 passes through the protruding parts 15 (FIG. 4). The folds 16, 17 are in opposite directions while the folds 17 and 18 are in the same direction (FIG. 2).

Figure 5:
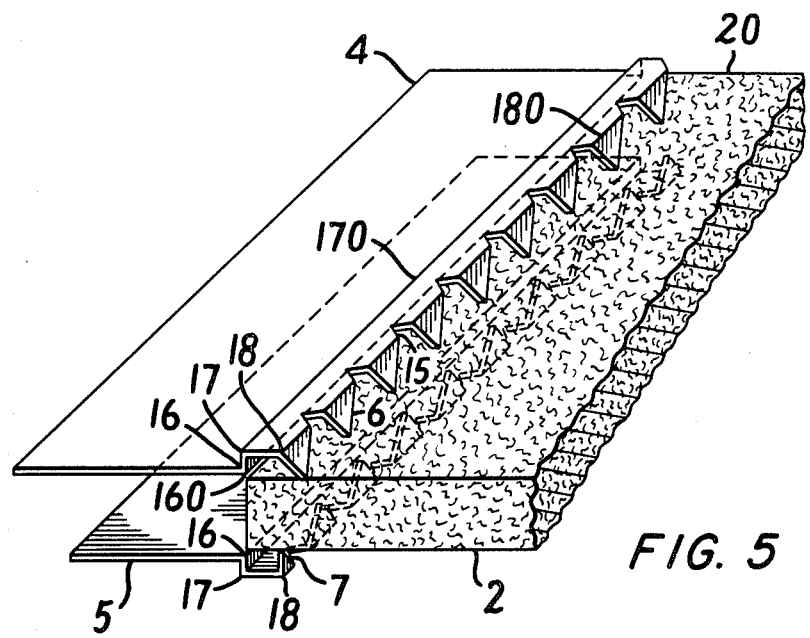
FIG. 5 shows, in perspective view, a portion of the electrode of FIGS. 1 to 3 during a phase of the manufacture of this electrode.

Each pair of plates 4, 5 is then arranged around the felt 2, at one end 20, 21 of this felt (FIG. 1), the teeth 6, 7 being arranged facing the felt 2 and the ends 20, 21 being opposite. FIG. 5 shows the end 20 of the felt 2 with a pair of plates 4, 5 which have been folded and arranged in this manner.

The ends 20, 21 are then clamped under pressure with the pairs of plates 4, 5 so that the teeth 6, 7 penetrate into the felt 2 over a length "h" (FIG. 2) and so that the inner corner faces (not provided with reference numbers) of the folds 17 apply themselves against the corresponding faces (not provided with reference numbers) of the ends 20, 21 of the felt 2, as shown in FIG. 2. One thus forms the assembly 100 consisting of the felt 2 and the plates 4, 5. The distance $l_1$ between the fold lines 160, 170 (FIG. 4) is selected as a function of the thickness "e" of the felt 2 (FIG. 2) in such a manner as to assure a predetermined pressure on the felt 2, and therefore a good clamping of the felt 2. When the skeleton 2 has a certain flexibility, this clamping results in a decrease $\Delta e$ of the initial thickness "e", the ratio $R_s = (\Delta e/e)$ being preferably at least equal to 5% and at most equal to 50%.

The lines 160, 170, 180 of the folds 16, 17, 18 are substantially perpendicular to the side faces 22, 23 of the felt 2 which are parallel to each other (FIG. 1).

Each tooth 6, 7 of the outlets 3 has two main faces, each of which forms part of a main face of the corresponding plate 4, 5. FIG. 2 shows, for instance, for an outlet 3, the main faces 60 of the teeth 6 and the main faces 70 of the teeth 7 in section along a plane perpendicular to these faces 60, 70.

The faces 60 are part of the main face 600 of the corresponding plate 4 and the faces 70 are part of the main face 700 of the corresponding plate 5. These faces 60, 70 penetrate over the height "h" into the skeleton 2 and they are oriented on the same side towards the central part of the skeleton 2, that is to say they correspond to outer faces of the folds 18 of the corresponding outlet 3. The faces 60, on the one hand, and the faces 70, on the other hand, are disposed practically in two planes parallel to each other and perpendicular to the faces 22, 23, 24, 25 of the skeleton 2, the faces 24, 25 being the main faces, parallel to each other, of the skeleton 2, these faces 24, 25 being perpendicular to the side faces 22, 23 (FIGS. 1 and 2). FIG. 3 shows the faces 60, 70 of an outlet 3, this figure being a cross section through the electrode 10 taken along a plane parallel to these faces, the faces 60 being shown in dashed line.

For each outlet 3, let $S_f$ be the sum of the areas of all the faces 60, 70 located within the skeleton 2, these areas including the areas of the openings 300 opening on these faces. Let S be the area of the cross-section of the skeleton in the region where it is clamped by this outlet 3, that is to say in the vicinity of the teeth 6, 7, the cross-section being taken along a plane parallel to the planes of the faces 60, 70 of this outlet. The ratio $R_a = (S_f/S)$ is preferably at least equal to 25% and at most equal to 70%. In fact, if the ratio $R_a$ is too small, the electrical resistance of the corresponding outlet 3 may become excessive and if the ratio $R_a$ is too great the mechanical strength of the assembly consisting of the skeleton 2 and this outlet 3 may become insufficient. The ratio $R_a$ is advantageously equal to about 50%.

In FIG. 3, $S_f$ corresponds to the sum of the areas of the triangles 60, 70, and S corresponds to the total area of the rectangle 200, that is to say to the area of the substantially rectangular section of the skeleton 2 clamped by the outlet 3 corresponding to the faces 60, 70.

The distance $l_2$ between the fold lines 170, 180 is not the same for the two plates 4, 5 of each outlet 3. In this way, for each outlet 3 the teeth 6, on the one hand, and the teeth 7, on the other hand, are separated by the distance "a" (FIG. 2). This distance "a" is preferably at least equal to 10% of the original thickness "e" of the skeleton 2, tha is to say the thickness before clamping, in order to avoid too extensive a shearing of the felt 2. This distance "a" varies, for instance, from 20% to 100% of the orignal thickness "e" in order to obtain an optimum between the conditions of mechanical strength and size.

It is advantageous, moreover, to alternate the position of the teeth 6, on the one hand, and the teeth 7, on the other hand, for each outlet 3 along the length L of said outlet, as shown in FIG. 3. This length L has, for instance, practically the same value as the length $L_e$ of the corresponding end 20, 21 (FIG. 1).

The free ends 30 of each pair of plates 4, 5 are then welded together with the material 31, for instance, a metallic material (FIG. 2), one of these ends 30—for instance the end corresponding to the plate 4—possibly having a greater width $l_3$ than the other plate of the pair and thus serving for the electrical connections, as shown in FIGS. 1 and 2, the width $l_3$ being measured from the line 160. The two ends 30 of each outlet 3 can possibly serve for electrical connections.

(c) Electrolytic deposition

The assembly 100 thus produced, consisting of the felt 2 and the plate 4, 5, is then placed in an electrolytic bath containing the ions of the metal or metals to be deposited in such a manner as to obtain the metallic deposit 8 which is inert under the conditions of use of the electrode 10.

Figure 6:
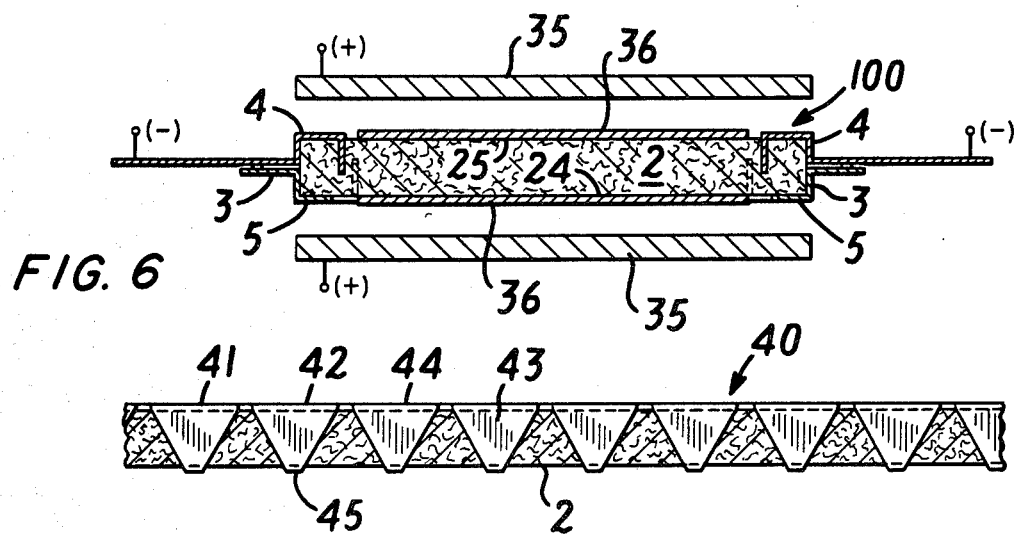
FIG. 6 shows, in cross section, the electrode of FIGS. 1 to 3 during another phase of its manufacture, this section being taken along the plane represented by the line II—II of FIG. 1.

The outlets 3 are connected to a terminal of a source of current (not shown), the felt 2 and the plates 4, 5 acting as negative electrode. Two positive electrodes 35 are located on opposite sides of this assembly 100, without being in direct contact with it, these positive electrodes 35 being connected to the other terminal of the source of current (FIG. 6).

The metallic deposit grows from the current outlets 3 towards the mass of the felt 2, which creates a metallic bridging between the fibers 9 and the current outlets 3. This intimate bridging takes place at the level of the teeth 6, 7 and furthermore from the surface of the plates 4, 5 which faces the felt 2, to each point of contact of the fibers 9 with these plates.

The number of points of contact is made very large due to the pressure imposed on the felt 2 by the plates 4, 5 upon the assembling, as previously described.

By means of a set of insulating masks 36 (FIG. 6), it is possible to effect a localized deposition solely in the regions of the felt 2 which are close to the current outlets 3, these masks 36 consisting of nonporous films applied to the free portions of the main faces 24, 25 of the felt 2, that is to say between the outlets 3. The plates 4, 5 should preferably have, at least in the portions thereof in contact with the felt 2, a transparency of 30% to 70%, for example on the order of 40%, this transparency representing, for a given area of a main face of each plate, the ratio between the area of the openings 300 of said surface and the total area of said surface. One thus makes certain that the electric field between the felt 2 and the plates 4, 5, on the one hand, and the positive electrodes 35, on the other hand, has access to the entire geometrical space arranged between the plates 4, 5 of each outlet 3. After having removed the masks 36 one can, if desired, proceed with a metallic electrolytic deposition throughout the mass of the felt 2 with the same bath or with a different bath. Due to its large specific surface the felt thus becomes coated uniformly with metallic deposit and becomes rigid throughout.

It goes without saying that the metallization of the assembly 100 could possibly be effected in a single operation for the anchoring of the outlets 3 and for the mass of the felt 2, if the masks 36 are not used.

(d) Deposition of active material

The deposition of active material in the felt 2 for the final production of the body 1 is effected in known manner, for instance by pasting or by chemical or electrochemical deposition. The positive or negative active material may in particular be a metal, for instance zinc, irion, cadmium, nickel, silver, manganese, an oxide or a hydroxide of these metals or of other metals, a salt, for instance a halide or a chalcogenide of a transition metal or a mixture of several of these substances. This active material is indicated schematically by the reference number 37 in FIG. 1.

The electrode in accordance with the invention can in particular be used as positive or negative electrode in an alkaline storage battery of the zinc-nickel, cadmium-nickel or iron-nickel type, the skeleton 2 being inert under the conditions of use of the electrode 10.

Th characteristics of the starting materials and of the assembly 100 before and after metallization are, for instance, as follows:

felt 2 before assembly—carbon felt; porosity on the order of 95% (ratio between the volume of the voids of the felt and its total volume); average diameter of the fibers on the order of 12 microns; thickness "e" of about 3.5 mm;

current outlets 3 before metallization—plates 4,5: sheets of nickel of a thickness of 0.1 to 0.2 mm; length L: 15 cm; distance $l_1$: about 1.5 to 1.6 mm, which gives a decrease $\Delta e$ in thickness of the felt 2 by compression of about 0.4 mm, namely a ratio $R_s$ of about 11%; distance $l_2$: about 5 mm for plate 4 and 6 mm for plate 5, which corresponds to a distance "a" of about 0.8 to 0.9 mm, "a" thus representing about 22% to 25% of the original thickness "e"; width $l_3$ of the ends 30: 5.7 cm for plate 4 and 4.5 cm for plate 5; length "h" of the teeth 6, 7: about 2.5 mm; total mass of the outlets 3 (that is to say mass of the plates 4, 5): 4 to 8 g depending on the type of sheet used;

metallic deposit—deposited metal: nickel; mass of nickel deposited for the anchoring of the current outlets 3: 1 to 2 g; it goes without saying that the anchoring deposit and/or the deposit on the rest of the felt may vary as desired in the quantities deposited and in the nature of the metallic deposit;

assembly 100 of the felt 2 and the outlets 3 after nickel plating: The mechanical strength of this assembly is substantially the same as that of the felt 2 nickel-plated by itself; the ohmic resistance of the assembly 100 is on the order of 0.4 m$\Omega$ when measured between, on the one hand, a point A of the felt 2, which point A is located in the immediate vicinity of an outlet 3 and, on the other hand, a point B located at one end 30 of this outlet 3 in the immediate vicinity of the fold line 160, the points A, B being located in a plane (not shown) parallel to the side faces 22, 23 of the felt 2 (FIG. 1); this measurement is made by means of an imposed current uniformly distributed over the entire length L of the outlet 3 where this measurement is effected; this resistance value varies depending on the type of felt 2, the type of sheets 4, 5 and the size of the nickel deposits.

Figure 7:
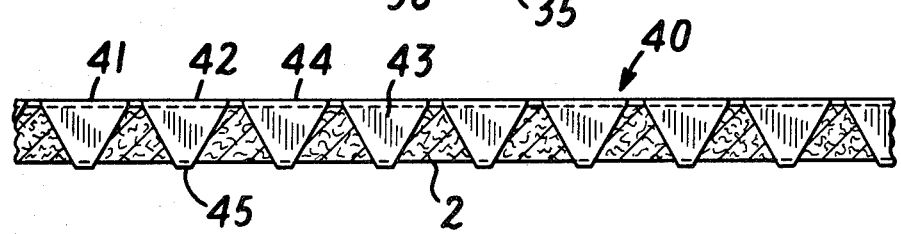
FIGS. 7, 8A and 8B show, in cross section, another electrode in accordance with the invention.
Figure 8A:
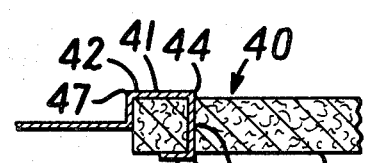
Figure 8B:
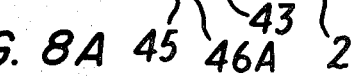

FIGS. 7, 8A and 8B show another electrode in accordance with the invention. This electrode 40 is similar to the electrode 10 which was previously described and shown in FIGS. 1 to 3 except that each of the two outlets 41 of this electrode 40 is formed of a single plate 42. For clarity in the drawing, a single outlet 41 is shown in FIGS. 7, 8A and 8B. Each of these plates 42 has teeth 43 which pass through the skeleton 2 over its entire thickness. FIG. 7 is taken along a cross-section of the electrode through a plane parallel to the average direction of these teeth 43, in a manner similar to FIG. 3. These teeth 43 can be made by means of a fold 44 effected on a flat sheet. The ends 45 of the teeth 43 extend from the skeleton 2 and are applied against this skeleton by means of the fold 46A or 46B, the skeleton 2 being thus clamped by pressure between these folds 44, on the one hand, and 46A or 46B, on the other hand. The folds 44 and 46A are of the same direction (FIG. 8A), while the folds 44 and 46B are in opposite directions (FIG. 8B). The plate 42 can possibly have another fold 47 similar to the fold 17 previously described and shown in FIGS. 1, 2, 4, 5 in order to improve the mechanical strength of the electrode 40 and decrease its electrical resistance. The electrode 40 may be made in simple manner since each outlet 41 has only one plate 42, which may or may not have openings.

The metallization is effected with a positive electrode (not shown), oriented on the side of the ends 45 with respect to the skeleton 2.

The preferred ratio $R_a$ of 25% to 70% defined previously from the electrode 10 is also valid for the electrode 40.

Figure 9:
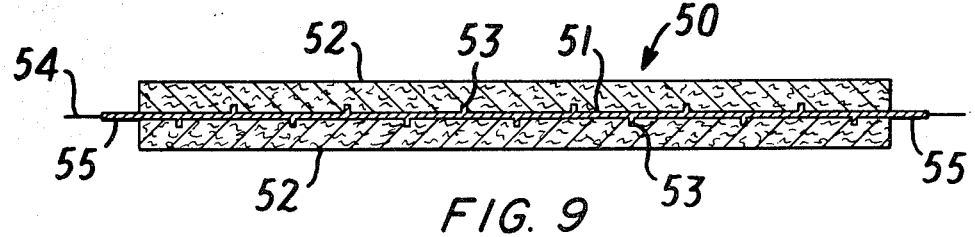
FIG. 9 shows, in cross section, another electrode in accordance with the invention.

FIG. 9 shows another electrode according to the invention. This electrode 50 has a conductive plate 51, for instance of nickel, arranged between two conductive porous skeletons 52 applied by pressure against the plate 51. The skeletons 52 are, for instance, felts of carbon fibers as in the electrode 10 previously described.

The plate 51 has roughnesses 53 in the form of spurs, arranged on opposite sides of a medium plane 54. These spurs 53 are made, for instance, by simple punching of the plate 51, the punched parts being then folded 90° with respect to the rest of the plate. The metallization, for instance, with nickel of the assembly formed by the plate 51 and the skeletons 52 is effected in a manner similar to that which has been described for the production of the electrode 1, but without insulating mask.

The plate 51 acts at the same time as collector of electric charges in the electrode 50 and current outlet due to its extensions 55 located beyond the porous skeletons 52. The arrangement of the electrode 50 can possibly be advantageous for electrodes of large dimensions or for electrodes which operate under high current densities when it is desired to reinforce the tensile and flexural strength of the electrode and decrease its internal ohmic resistance.

The electrodes in accordance with the invention have the following advantages:

(1) they lend themselves particularly to mechanical and electrical integration in the general assembly of the devices in which they are used;

(2) they permit good mechanical strength of the connection between the skeletons and current outlets and therefore good mechanical strength of the electrodes;

(3) they give rise to little ohmic resistance;

(4) the chemical inertia of the electrical and mechanical connection between the electrode and the other elements of the general mounting is easily obtained by a suitable selection of the materials used for the current outlets and the connecting deposits;

(5) it is possible to obtain an ohmic resistance which is distributed practically uniformly over the entire thickness of the electrode bodies, which favors the homogeneity of electrochemical operation of the electrodes;

(6) it is possible to have a very varied selection with respect to the shape and the structure of these electrodes as well as with respect to the arrangement of the current outlets with respect to the skeleton; thus, for instance, the drainage of the electric charges is not necessarily effected at the ends of the skeleton; this is particularly important in the performance of electrochemical generators in which effective drainage of the electrical charges must be assured by a judicious arrangement of the points of convergence of the current lines.

Of course, the invention is not limited to the embodiments which have been described above on the basis of which one can contemplate other forms and manners of embodiment without thereby going beyond the scope of the invention. Thus, the skeletons have been described as fibrous but it is obvious that other conductive porous skeletons are possible, for instance, skeletons having sintered or agglomerated particles, rigid or flexible foams, mixtures or assemblies of fibers and particles or binders, for instance fibers spot-welded to thermoplastic, elastomeric or metallic materials. The use of felts is, however, preferred in view of the simplicity in construction. It goes without saying, furthermore, that the skeleton of the electrodes in accordance with the invention may have a general shape other than flat, for instance a tubular shape.

What is claimed is:

1. A process for producing an electrode comprising, on the one hand, at least one body formed at least in part of an electron-conductive porous skeleton with two main faces and, on the other hand, at least one current outlet, characterized by:

(a) making the current outlet with at least one electron-conductive plate having roughnesses, said roughnesses having, for each plate, main faces arranged substantially in a plane, the ratio $R_a = (S_f/S)$ being at least equal to 25% and at most equal to 70%, $S_f$ representing the sum of the areas of these main faces for all the roughnesses of the outlet, and S representing the area of the cross-section of the skeleton in the vicinity of the roughnesses of said outlet, the cross-section being taken along a plane parallel to the plane or planes of said main faces of the roughnesses, $S_f$ including the areas of any openings in the main faces of each plate;

(b) causing the roughnesses to penetrate into the skeleton;

(c) clamping the skeleton by pressure where it is in contact with the plate to result in a decrease $\Delta e$ of the original thickness "e" of the skeleton, the ratio $R_S = (\Delta d/e)$ being at least equal to 5% and at most equal to 50%;

(d) electrolytically depositing a metal in the skeleton and firmly connecting the plate to the skeleton by means of the electrolytic metallic deposit which adheres both to the skeleton and to the plate, said deposit being inert under the conditions of use of the electrode.

2. The process according to claim 1, characterized by folding the plate at at least one place in such a manner that the roughnesses are formed by a part of the fold or of at least one of the folds.

3. The process according to claim 2, characterized by, prior to folding the plate, cutting the plate out in such a manner as to obtain protruding parts which produce triangular teeth upon folding of the plate.

4. The process according to claim 1, characterized by applying nonporous insulating films to the main faces of the skeleton at least during the start of the electrolytic depositing.

* * * * *